Patented July 4, 1950

2,513,346

UNITED STATES PATENT OFFICE 2,513,346

PROCESS FOR OBTAINING ORGANIC AMINO DIOLS

George W. Moersch and Allen C. Moore, Detroit, Mich., assignors to Parke, Davis & Company, Detroit, Mich., a corporation of Michigan No Drawing. Application December 21, 1948, Serial No. 66,594

11 Claims. (Cl. 260—570.6)

This invention relates to a process for the production of organic amino diols and acid addition salts thereof. More particularly, the invention relates to a process for the conversion of one optically racemic diastereoisomeric form of an amino diol derivative to an optically racemic amino diol having the opposite steric configuration.

The compounds with which this invention is concerned have the general formula,

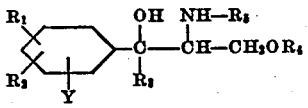

where Y is hydrogen or a —NO₂ group, $R_1$ and $R_2$ are the same or different and represent hydrogen, halogen, lower alkyl or lower alkoxy radicals, $R_3$ is hydrogen or a lower alkyl radical and $R_4$ and $R_5$ are the same or different and represent hydrogen or acyl radicals such as lower aliphatic acyl, halogen substituted lower aliphatic acyl, benzoyl, substituted benzoyl, aralphatic acyl and the like radicals. By inspection of this general formula it will be appreciated by those skilled in the art that these products exist in one of two diastereoisomeric or "structural" forms depending upon the planar relationship of the polar groups on the two asymmetric carbon atoms. Where the two most highly polar of the groups on the asymmetric carbon atoms lie on the same side of the plane of the two carbon atoms the compounds are in the so-called "cis" or "regular" form. Conversely, the compounds wherein the two most highly polar groups lie on opposite sides of the plane of the two carbon atoms are said to be in the "trans" or "pseudo" structural form. Because of the difficulty of representing these structural differences in graphic formulae the customary structural formulae will be used herein and the structural or diastereoisomeric form of the product designated by the symbol "ψ" for the products having the "trans" or "pseudo" configuration and the abbreviation "reg." for the products having the "cis" or regular configuration.

In accordance with the invention (dl)-reg. amino diol derivatives of formula,

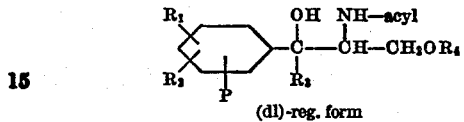

(dl)-reg. form are converted to acid addition salts of (dl)-ψ amino diols of formula,

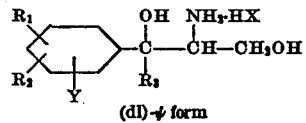

(dl)-ψ form by treatment with a thionyl halide followed by hydrolysis of the intermediate product so formed, where $R_1$, $R_2$, $R_3$, $R_4$ and Y have the same significance as given above. Acyl represents an acyl radical such as a lower aliphatic acyl, a halogen substituted lower aliphatic acyl, a benzoyl, a substituted benzoyl, an aralphatic acyl and the like radicals and X is halogen. The amino diol can be isolated from the reaction mixture either as the hydrohalide salt or, after neutralization of the salt, as the free base. Using the symbols defined above, these transformations may be diagrammatically illustrated as follows:

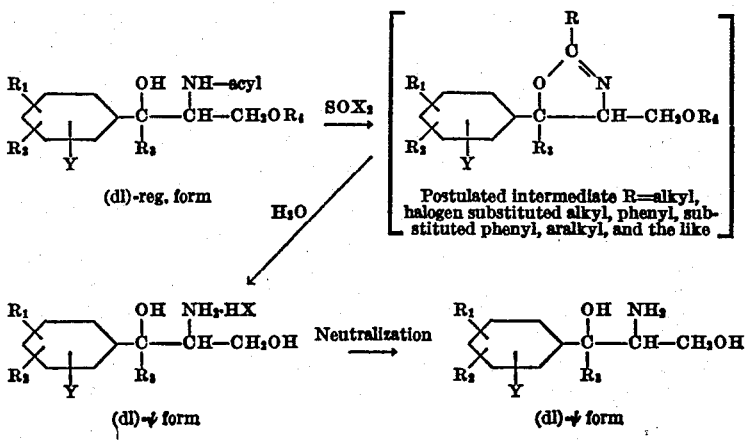

The first phase of the conversion, the reaction of the (dl)-reg. amino diol derivative with the thionyl halide, is carried out below about 50° C. either in the presence or absence of a substantially anhydrous, inert organic solvent such as benzene, toluene, xylene, chloroform, carbon tetrachloride and the like. In general, it is preferable not to use any solvent other than an excess of the thionyl halide. When carrying out the reaction in this manner particularly good results are obtained by the use of about 4 to 6 parts by weight of the thionyl halide for each part by weight of the amino diol derivative. The preferred temperature for carrying out this step in the process is in the neighborhood of about 20 to 35° C.

The hydrolysis phase of the conversion is carried out by adding sufficient water to the thionyl halide-(dl)-reg. amino diol reaction mixture to bring about hydrolysis of any excess thionyl halide and the intermediate product and heating the resultant mixture for a short time at about 60 to 110° C. In practice it is, of course, preferable to employ more than the minimal amount of water necessary for the hydrolysis but the exact amount is not critical. Where a solvent has been employed in the first phase of the reaction it is preferable from the standpoint of simplicity in working up the reaction mixture to carry out the hydrolysis step before removing the solvent. The (dl)-ψ-amino diol products can be isolated from the reaction mixture in a number of different ways. Where the organic acid(s) formed by hydrolysis of the acyl group(s) is volatile the hydrohalic acid addition salt of the (dl)-ψ-amino diol can be obtained by evaporation of the reaction mixture to dryness. Where the organic acid(s) formed by the hydrolysis of the acyl group(s) is not volatile it can be removed from the reaction mixture by extraction with a water immiscible organic solvent and the hydrohalic acid addition salt of the (dl)-ψ-amino diol recovered from the aqueous phase by evaporation. If desired, the free base of the (dl)-ψ-amino diol can be obtained by neutralizing the acid addition salt present in the reaction mixture and separating the (dl)-ψ free base from the solution either by filtration or extraction.

The (dl)-reg. amino diol derivatives used in the practice of the invention need not be in the pure state and in fact one of the more important applications of the invention consists in converting a mixture composed of the (dl)-reg. and (dl)-ψ forms of an amino diol derivative into a product consisting solely of an acid addition salt of a (dl)-ψ-amino diol. The (dl)-ψ diastereoisomer present in the mixture used as the starting material does not undergo any change in structural configuration during the process while the (dl)-reg. diastereoisomer is converted into the (dl)-ψ diastereoisomer. Although the (dl)-ψ-diastereoisomer does not undergo any change in structural configuration during the process, the acyl group present on the amino group and, if any, the acyl group on the primary alcohol group are removed during the hydrolysis step with the result that a product consisting solely of an acid addition salt of a (dl)-ψ amino diol is obtained. This application of the invention can be diagrammatically illustrated as follows:

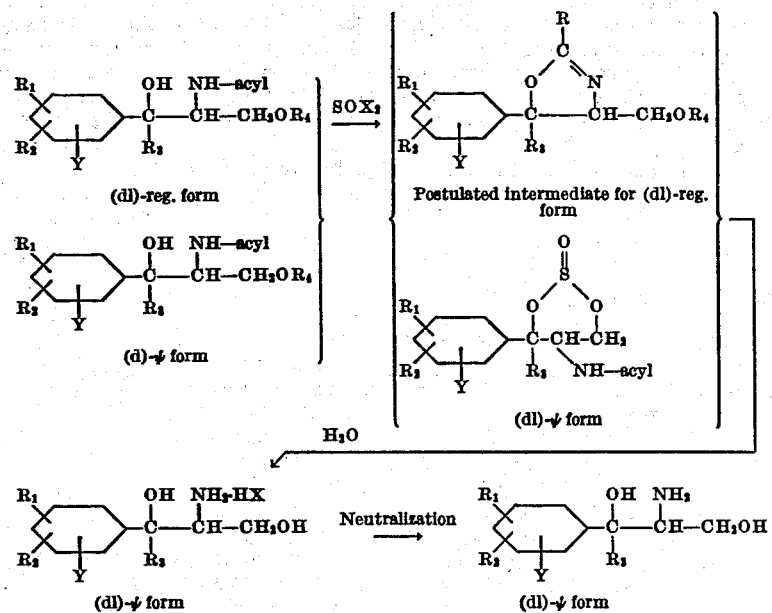

where R, $R_1$, $R_2$, $R_3$, $R_4$, Y and X have the same significance as given above.

The amino diol products obtained by the process of the invention are useful as intermediates in the preparation of organic compounds possessing antibiotic activity. For example, the products of Examples 1 and 2, (dl)-ψ-1-p-nitrophenyl-2-aminopropane-1,3-diol and (dl)-ψ-1-phenyl-2-aminopropane-1,3-diol and their acid addition salts, are particularly useful in the preparation of (l)-ψ-1-p-nitrophenyl-2-dichloroacetamidopropane-1,3-diol, a compound possessing outstanding activity as an antibiotic.

The invention is illustrated by the following examples:

*Example 1*

(a) 5 g. of (dl)-reg.-1-p-nitrophenyl-2-acetamidopropane-1,3-diol (M. P. 189–93° C.) is added to 15 cc. of thionyl chloride at about 25° C. Hydrogen chloride is evolved and the solid dissolves with the production of a light green solution. The mixture is allowed to stand for fifteen minutes and then treated with 15 cc. of water which causes vigorous gas evolution and a marked cooling of the mixture. The solution is heated on a steam bath for one hour, decolorized with charcoal and the solution made alkaline with concentrated ammonium hydroxide. The solution is cooled and the crystalline (dl)-ψ-1-p-nitrophenyl-2-aminopropane-1,3-diol of formula,

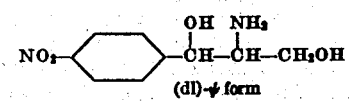
(dl)-ψ form collected; M. P. 130-2° C. Recrystallization from hot water yields the pure free base melting at 137-8° C.

(b) 10 g. of (dl)-reg.-1-nitrophenyl-2-acetamidopropane-1,3-diol is added to 30 cc. of thionyl chloride at 27° C. and the mixture allowed to stand for fifteen minutes. 30 cc. of water is added cautiously and the resulting solution evaporated to dryness. The residue is taken up in and crystallized from 55 cc. of absolute ethanol to obtain the crystalline (dl)-ψ-1-p-nitrophenyl-2-aminopropane-1,3-diol hydrochloride of formula,

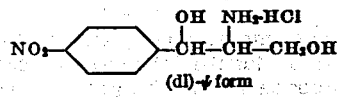
(dl)-ψ form melting at 170-2° C. The hydrochloride salt is dissolved in 35 cc. of water, the solution made alkaline to pH 10 with 10% sodium hydroxide solution and the crystalline free base which separates from the solution collected. The (dl)-ψ-1-p-nitrophenyl-2-aminopropane-1,3-diol so obtained melts at 133-5° C. before recrystallization and after recrystallization from water at 137-8° C.

(c) 5 g. of (dl)-reg.-1-p-nitrophenyl-2-acetamido-3-acetoxypropane-1-ol is added to 15 cc. of thionyl chloride at 25-7° C. and the resulting solution allowed to stand for about fifteen minutes. 15 cc. of water is added cautiously to the reaction mixture and after the vigorous reaction has subsided the mixture is heated on a steam bath for about one hour. The solution is decolorized with charcoal and made alkaline with concentrated ammonium hydroxide. The solution is cooled and the crystalline (dl)-ψ-1-p-nitrophenyl-2-aminopropane-1,3-diol which separates collected and purified by recrystallization from water; M. P. 137-8° C.

(d) A mixture consisting of 2 g. of (dl)-reg.-1-p-nitrophenyl-2-acetamidopropane-1,3-diol and 1 g. of (dl)-ψ-1-p-nitrophenyl-2-acetamidopropane-1,3-diol is added to 9 cc. of thionyl chloride at about 25° C. After about fifteen minutes 10 cc. of water is added cautiously, the mixture heated on a steam bath for two hours and then evaporated to dryness. The residue which consists of the hydrochloride salt of (dl)-ψ-1-p-nitrophenyl-2-aminopropane-1,3-diol is dissolved in a small amount of water, the solution charcoaled and then made alkaline with ammonium hydroxide. The solution is cooled and the crystalline (dl)-ψ-1-p-nitrophenyl-2-aminopropane-1,3-diol which separates collected; M. P. 135-7° C. Recrystallization from water raises the melting point to 137-8° C.

Example 2

(a) 5 g. of (dl)-reg.-1-phenyl-2-acetamidopropane-1,3-diol is added to 15 cc. of thionyl chloride maintained at 25° C. over a period of fifteen minutes. Hydrogen chloride is evolved vigorously and the temperature of the solution tends to rise during the addition. After the addition has been completed the solution is allowed to stand for fifteen to thirty minutes and then 30 cc. of water is added cautiously. The resulting mixture is heated on a steam bath for one hour and evaporated to dryness to obtain the hydrochloride salt of (dl)-ψ-1-phenyl-2-aminopropane-1,3-diol of formula,

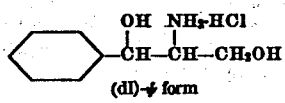
(dl)-ψ form

The product in many instances is in the form of a light colored oil. If desired, it may be converted to the crystalline (dl)-ψ-1-phenyl-2-acetamido-1,3-diacetoxypropane, M. P. 72-3° C., by treatment with acetic anhydride and pyridine followed by recrystallization from ethyl acetate-petroleum ether mixture.

(b) 5 g. of (dl)-reg.-1-phenyl-2-acetamido-3-acetoxypropane-1-ol is added to 15 cc. of thionyl bromide keeping the temperature at 25° C. The resulting solution is allowed to stand for fifteen minutes and then 15 cc. of water is added cautiously. The reaction mixture is heated on a steam bath for about one hour, cooled and made alkaline to pH 10 with sodium hydroxide solution. The mixture is extracted with ethyl acetate and the ethyl acetate extracts evaporated to dryness in vacuo to obtain the desired (dl)-ψ-1-phenyl-2-aminopropane-1,3-diol of formula,

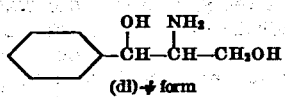
(dl)-ψ form which melts at 81-3° C. when pure.

Alternatively the reaction mixture can be evaporated to dryness in vacuo to obtain the hydrobromide salt of (dl)-ψ-1-phenyl-2-aminopropane-1,3-diol.

(c) 5 g. of (dl)-reg.-1-phenyl-2-benzamidopropane-1,3-diol is added slowly to 15 cc. of thionyl chloride keeping the temperature below 30° C. After the addition has been completed the solution is allowed to stand for fifteen minutes and then cautiously treated with 25 cc. of water. The mixture is heated on a steam bath for one hour, cooled and made alkaline with 10 N sodium hydroxide solution. The solution is extracted with ethyl acetate, the extracts dried and the ethyl acetate distilled in vacuo to obtain the desired (dl)-ψ-1-phenyl-2-aminopropane-1,3-diol.

This same product can also be obtained by substituting an equivalent amount of (dl)-reg.-1-phenyl-2-chloroacetamidopropane-1,3-diol for the benzamido derivative used in the above procedure.

(d) A mixture consisting of 2 g. of (dl)-reg.-1-phenyl-2-acetamidopropane-1,3-diol and 1 g. of (dl)-ψ-1-phenyl-2-acetamidopropane-1,3-diol is added to 9 cc. of thionyl chloride keeping the temperature at about 25° C. After solution is complete and the mixture has been allowed to stand for about fifteen minutes, 10 cc. of water is added cautiously and the mixture heated on a steam bath for about two hours. The reaction mixture is evaporated to dryness and the residue which consists of (dl)-ψ-1-phenyl-2-aminopropane-1,3-diol hydrochloride taken up in 2 cc. of hot water. The solution is allowed to cool and the crystalline (dl)-ψ-1-phenyl-2-aminopropane-1,3-diol hydrochloride which separates collected; M. P. 178° C.

A further quantity of the desired (dl)-ψ isomer can be obtained in the form of its triacetate by evaporating the aqueous solution to dryness, treating it with acetic anhydride and pyridine at room temperature for twenty-four hours and evaporating the mixture to dryness in vacuo. The (dl)-ψ-1-phenyl-2-acetamido-1,3-diacetoxypropane is collected and purified by recrystallization from ethyl acetate-petroleum ether mixture; M. P. 70° C.

Example 3

(a) 10 g. of (dl)-reg.-1-o-methyl-p-nitrophenyl-2-propionamidopropane-1,3-diol is added slowly to 35 cc. of thionyl chloride keeping the temperature below about 30° C. After the addition has been completed, 35 cc. of water is added slowly and then the mixture heated for one hour on a steam bath. The reaction mixture is cooled, decolorized with charcoal and the solution made alkaline with concentrated ammonium hydroxide. The solution is cooled and the crystalline (dl)-ψ-1-o-methyl-p-nitrophenyl-2-aminopropane-1,3-diol of formula,

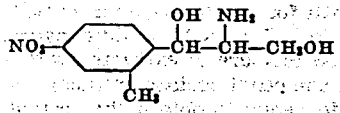

(dl)-ψ form collected and recrystallized from water.

(b) By substituting 10 g. of (dl)-reg.-1-o-methylphenyl-2-propionamidopropane-1,3-diol for the corresponding p-nitro compound used in the above procedure one obtains (dl)-ψ-1-o-methylphenyl-2-aminopropane-1,3-diol. The sulfate salt of this product can be prepared by dissolving the free base in water containing an equivalent amount of sulfuric acid and evaporating the solution to dryness in vacuo.

Example 4

10 g. of (dl)-reg.-1-m-methoxyphenyl-2-phenylacetamidopropane-1,3-diol is added to 20 cc. of thionyl chloride keeping the temperature below about 30° C. After the addition has been completed, the mixture is allowed to stand for a short time and then 30 cc. of water added cautiously. The reaction mixture is heated on a steam bath for about an hour, the solution decolorized with charcoal and extracted exhaustively with ether to remove the phenylacetic acid. The aqueous solution is evaporated to dryness in vacuo to obtain the hydrochloride salt of (dl)-ψ-1-m-methoxyphenyl-2-aminopropane-1,3-diol which has the formula,

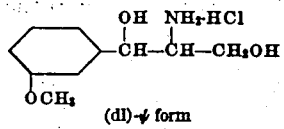

(dl)-ψ form

If desired, the free base can be obtained by neutralization of the salt and thence converted to some other acid addition salt such as the tartrate, camphor sulfonate, benzoate, etc. by treatment of the base with an alcoholic solution of the corresponding acid.

When (dl)-reg.-1-p-nitro-m-methoxyphenyl-2-phenylacetamidopropane-1,3-diol is substituted for the corresponding des-nitro compound in the above procedure one obtains (dl)-ψ-1-p-nitro-m-methoxyphenyl-2-aminopropane-1,3-diol or an acid salt thereof, the particular form of the product depending, of course, upon the isolation method employed.

Example 5

15 g. of (dl)-reg.-1-(3',4'-dimethylphenyl)-2-acetamido-3-benzoxypropane-1-ol is added slowly to 60 cc. of thionyl chloride at about 20° C. The mixture is allowed to stand for fifteen to thirty minutes and then 60 cc. of water added cautiously. The resulting mixture is heated on a steam bath for about an hour, cooled and extracted exhaustively with ether to remove the benzoic acid and most of the acetic acid formed by the hydrolysis. The aqueous solution is made alkaline with concentrated ammonium hydroxide and the mixture extracted with ethyl acetate. The ethyl acetate extracts are dried and the ethyl acetate distilled in vacuo to obtain the desired (dl)-ψ-1-(3',4'-dimethylphenyl)-2-aminopropane-1,3-diol. This product has the formula,

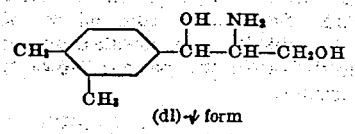

(dl)-ψ form

In a similar manner by employing (dl)-reg.-1-(2'-nitro-4',5'-dimethylphenyl)-2-acetamido-3-benzoxypropane-1-ol in the above procedure one obtains (dl)-ψ-1-(2'-nitro-4',5'-dimethylphenyl)-2-aminopropane-1,3-diol.

Example 6

10 g. of (dl)-reg.-3-(3'-chloro-5'-nitrophenyl)-2-acetamido-1-acetoxybutane-3-ol is added slowly to 30 cc. of thionyl bromide keeping the temperature in the neighborhood of 25° C. The resulting mixture is allowed to stand for about fifteen minutes and then 30 cc. of water is added cautiously. The reaction mixture is heated on a steam bath for one hour, decolorized with charcoal and the solution made alkaline with concentrated ammonium hydroxide. The crystalline (dl)-ψ-3-(3'-chloro-5'-nitrophenyl)-2-amino-butane-1,3-diol which separates from the cool solution is collected. It has the formula,

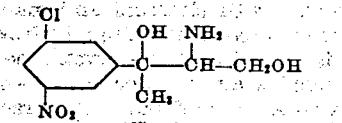

(dl)-ψ form

By employing (dl)-reg.-3-(3',5'-dichlorophenyl)-2-acetamido-1-acetoxybutane-3-ol in the above procedure (dl)-ψ-3-(3',5'-dichlorophenyl)-2-aminobutane-1,3-diol is obtained.

The (dl)-reg. acylamido diol and acylamido acyloxy alcohol compounds used as starting materials in the practice of the present invention can be prepared by the methods described in the copending application of Harry M. Crooks, Jr., Mildred C. Rebstock, John Controulis and Quentin R. Bartz entitled "Organic Nitrogen Compounds and Methods of obtaining the Same" bearing Serial No. 15,264 and filed on March 16, 1948. This application has matured into Patent No. 2,483,884. One of the methods described in said application for the preparation of the (dl)-reg. acylamido acyloxy alcohol compounds, involves diacylating the corresponding (dl)-reg. amino diol with an acyl anhydride at about 70° C. The (dl)-reg. acylamido acyloxy alcohol compounds so obtained can be converted to the corresponding (dl)-reg. acylamido diols by hydrolysis with one equivalent of alkali in cold aqueous acetone solution. Where the desired starting material is an acylamido acyloxy alcohol compound wherein the acyl groups on the amino and alcohol radicals are different the corresponding (dl)-reg. acylamido diol compound is acylated again with an acyl anhydride at about 70° C. Still another method for preparing the (dl)-reg. acylamido diol starting materials consists in reacting the free (dl)-reg. amino diol with an acyl halide or anhydride under aqueous conditions in the presence of a basic substance. If desired, this latter transformation can also be carried out by heating the free amino diol with an acyl ester under anhydrous conditions.

What we claim as our invention is:

1. Process which comprises reacting a thionyl halide with a (dl)-reg. amino diol derivative of formula,

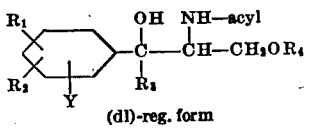

(dl)-reg. form and thereafter hydrolyzing the intermediate product so formed to obtain an acid addition salt of a (dl)-$\psi$-amino diol of formula,

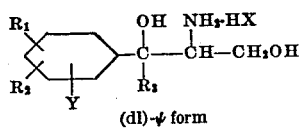

(dl)-$\psi$ form where Y is a member of the class consisting of hydrogen and —$NO_2$, $R_1$ and $R_2$ are members of the class consisting of hydrogen, halogen, lower alkyl and lower alkoxy radicals, $R_3$ is a member of the class consisting of hydrogen and lower alkyl radicals, $R_4$ is a member of the class consisting of hydrogen and acyl radicals and X is halogen.

2. Process which comprises reacting a thionyl halide with a (dl)-reg.-amino diol derivative of formula,

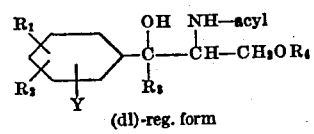

(dl)-reg. form at a temperature below about 50° C. under substantially anhydrous conditions and thereafter hydrolyzing the intermediate product so formed with water at a temperature between about 60 and 110° C. to obtain an acid addition salt of (dl)-$\psi$-amino diol of formula,

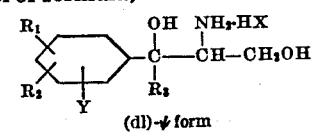

(dl)-$\psi$ form where Y is a member of the class consisting of hydrogen and —$NO_2$, $R_1$ and $R_2$ are members of the class consisting of hydrogen, halogen, lower alkyl and lower alkoxy radicals, $R_3$ is a member of the class consisting of hydrogen and lower alkyl radicals, $R_4$ is a member of the class consisting of hydrogen and acyl radicals and X is halogen.

3. Process which comprises reacting thionyl chloride with a (dl)-reg. amino diol derivative of formula,

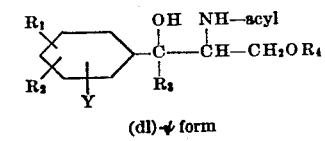

(dl)-$\psi$ form at a temperature below about 50° C. under substantially anhydrous conditions and thereafter hydrolyzing the intermediate product so formed with water at a temperature between about 60 and 110° C. to obtain a hydrochloride salt of a (dl)-$\psi$-amino diol of formula,

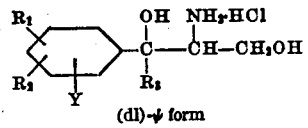

(dl)-$\psi$ form where Y is a member of class consisting of hydrogen and —$NO_2$, $R_1$ and $R_2$ are members of the class consisting of hydrogen, holagen, lower alkyl and lower alkoxy radicals, $R_3$ is a member of the class consisting of hydrogen and lower alkyl radicals and $R_4$ is a member of the class consisting of hydrogen and acyl radicals.

4. Process which comprises reacting a thionyl halide with a (dl)-reg. amino diol derivative of formula,

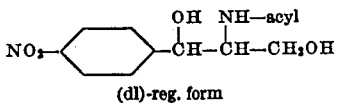

(dl)-reg. form at a temperature below about 50° C. under substantially anhydrous conditions and thereafter hydrolyzing the intermediate product so formed with water at a temperature between about 60 and 110° C. to obtain an acid addition salt of a a (dl)-$\psi$-amino diol of formula,

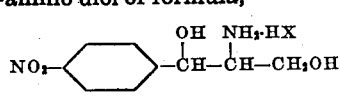

(dl)-$\psi$ form where X is halogen.

5. Process which comprises reacting a thionyl halide with a (dl)-reg.-amino diol derivative of formula,

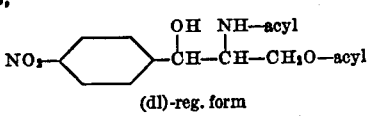

(dl)-reg. form at a temperature below about 50° C. under substantially anhydrous conditions and thereafter hydrolyzing the intermediate product so formed with water at a temperature between about 60 and 110° C. to obtain an acid addition salt of a (dl)-$\psi$-amino diol of formula,

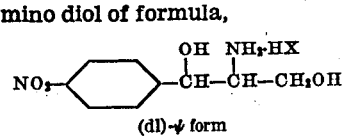

(dl)-$\psi$ form where X is halogen.

6. Process which comprises reacting a thionyl halide with a (dl)-reg. amino diol derivative of formula,

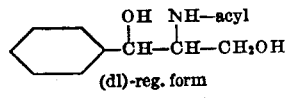

(dl)-reg. form at a temperature below about 50° C. under substantially anhydrous conditions and thereafter hydrolyzing the intermediate product so formed with water at a temperature between about 60 and 110° C. to obtain an acid addition salt of a (dl)-$\psi$-amino diol of formula,

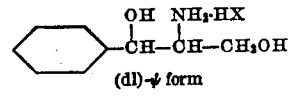

(dl)-$\psi$ form where X is a halogen atom.

7. Process which comprises reacting a mixture consisting of the (dl)-ψ and (dl)-reg. forms of an amino diol derivative of formula,

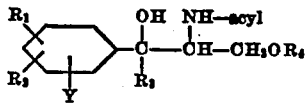

with a thionyl halide and hydrolyzing the reaction product thereby obtaining an acid addition salt of a (dl)-ψ amino diol of formula,

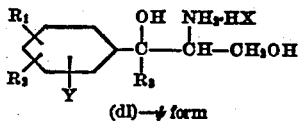

(dl)-ψ form where Y is a member of the class consisting of hydrogen and —NO₂, R₁ and R₂ are members of the class consisting of hydrogen, halogen, lower alkyl and lower alkoxy radicals, R₃ is a member of the class consisting of hydrogen and lower alkyl radicals, R₄ is a member of the class consisting of hydrogen and acyl radicals and X is halogen.

8. Process which comprises reacting a mixture consisting of the (dl)-ψ and (dl)-reg. forms of an amino diol derivative of formula,

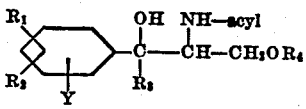

with thionyl chloride at a temperature below about 50° C. under substantially anhydrous conditions and hydrolyzing the reaction product with water at a temperature between about 60 and 110° C. thereby obtaining a hydrochloride salt of a (dl)-ψ amino diol of formula,

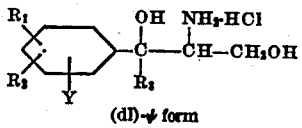

(dl)-ψ form where Y is a member of the class consisting of hydrogen and —NO₂, R₁ and R₂ are members of the class consisting of hydrogen, halogen, lower alkyl and lower alkoxy radicals, R₃ is a member of the class consisting of hydrogen and lower alkyl radicals and R₄ is a member of the class consisting of hydrogen and acyl radicals.

9. A process which comprises reacting a (dl)-reg. amino diol derivative of formula,

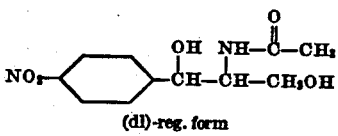

(dl)-reg. form with thionyl chloride at a temperature below about 50° C. under substantially anhydrous conditions and thereafter hydrolyzing the intermediate product so formed with water at a temperature between about 60 and 110° C. to obtain a hydrochloride salt of a (dl)-ψ-amino diol of formula,

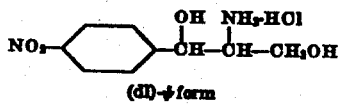

(dl)-ψ form

10. Process which comprises reacting a (dl)-reg. amino diol derivative of formula,

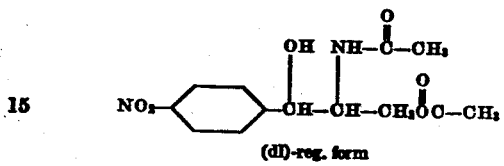

(dl)-reg. form with thionyl chloride at a temperature below about 50° C. under substantially anhydrous conditions and thereafter hydrolyzing the intermediate product so formed with water at a temperature between about 60 and 110° C. to obtain a hydrochloride salt of a (dl)-ψ-amino diol of formula,

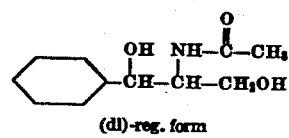

(dl)-ψ form

11. A process which comprises reacting a (dl)-reg. amino diol derivative of formula,

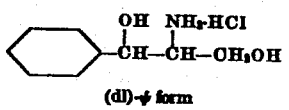

(dl)-reg. form with thionyl chloride at a temperature below about 50° C. under substantially anhydrous conditions and thereafter hydrolyzing the intermediate product so formed with water at a temperature between about 60 and 110° C. to obtain a hydrochloride salt of a (dl)-ψ-amino diol of formula, OH NH₂·HCl
⟨⟩—CH—CH—CH₂OH (dl)-ψ form

GEORGE W. MOERSCH.
ALLEN C. MOORE.

REFERENCES CITED

The following references are of record in the file of this patent:

UNITED STATES PATENTS

| Number | Name | Date |
|---|---|---|
| 1,965,502 | Legerlotz | July 3, 1934 |

OTHER REFERENCES

Fieser et al., "Organic Chemistry" (D. C. Heath and Co., Boston, 1944), pages 279–280.